UNITED STATES PATENT OFFICE.

RICHARD SOULE, OF BROOKLINE, MASSACHUSETTS.

IMPROVEMENT IN PROCESSES OF BLEACHING AND CLARIFYING SACCHARINE JUICES.

Specification forming part of Letters Patent No. 154,722, dated September 1, 1874; application filed February 14, 1874.

*To all whom it may concern:*

Be it known that I, RICHARD SOULE, of Brookline, in the county of Norfolk and State of Massachusetts, have invented an Improved Process of Bleaching and Clarifying Saccharine Juices and Sirups, to be afterward converted into sugar; and I hereby declare that the following is a full, clear, and exact description of the same.

This invention relates to an improvement in the process of manufacturing sugar, whereby the saccharine juices, and sirups from which it is made, are bleached and clarified in a more rapid, economical, and perfect manner than heretofore; and it consists in the use of chloride of lime and sulphate of alumina for this purpose, as will now be described.

The chloride of lime is to be mixed with a quantity of tepid water sufficient to make a magma or thin paste, and in this state is to be poured into the vessel containing the sweet liquor or sirup, which may be of a temperature varying from 150° to 200° Fahrenheit, and of a density varying from 15° to 25° Baumé. Immediately afterward, the sulphate of alumina, previously dissolved in three times its weight of warm water, is to be added. On stirring the sirup thus treated a chemical decomposition takes place, by which chlorine gas is set free; and the alumina and sulphate of lime are precipitated, carrying along with them a portion of the coloring matter and most of the insoluble impurities. At the same time a scum rises, which may be taken from the surface by a skimmer. The precipitate may be removed by filtration, or by allowing it to subside and drawing off the clear liquor above it, as may be found most convenient. Any surplus of the chlorine gas disengaged and dissolved in the liquor beyond what may be expended in destroying the coloring matter will be dissipated by evaporation in reducing the sirup to the crystallizing-point.

Solutions of brown sugar, or of glucose, or the juice of the sugar-cane, of sorghum, or of beets, or any other sirup, juice, or sweet liquor from which sugar is to be made, may be treated as above described, and the quantity of chloride of lime and sulphate of alumina required will depend upon the amount of coloring matter and other impurities in the sirup to be bleached and clarified. For one hundred (100) pounds sugar of the color and grade of that known as No. 12, Dutch standard, dissolved in fifteen gallons of water, making about twenty gallons of sirup, two (2) pounds of chloride of lime, and three (3) pounds of sulphate of alumina will be sufficient.

I have found that these proportions give the best results; but they may be varied without departing from the spirit of my invention, care being taken not to use too large a quantity of the sulphate of alumina.

What I claim as my invention, and desire to secure by Letters Patent, is—

The within-described process of bleaching and clarifying saccharine juices and sirups by treating them with chloride of lime and sulphate of alumina, substantially as set forth.

Witness my hand this 10th day of February, A. D. 1874.

RICHARD SOULE.

In presence of—
P. E. TESCHEMACHER,
W. J. CAMBRIDGE.